US010604045B2

(12) United States Patent
Marques et al.

(10) Patent No.: US 10,604,045 B2
(45) Date of Patent: Mar. 31, 2020

(54) METHOD OF MANUFACTURING A SEAT BACK AND CUSHION ASSEMBLY

(71) Applicant: LEAR CORPORATION, Southfield, MI (US)

(72) Inventors: Jose Marques, Vaux sus Seine (FR); Nathalie Navarro, Viroflay (FR)

(73) Assignee: LEAR CORPORATION, Southfield, MI (US)

( * ) Notice: Subject to any disclaimer, the term of this patent is extended or adjusted under 35 U.S.C. 154(b) by 62 days.

(21) Appl. No.: 15/971,656

(22) Filed: May 4, 2018

(65) Prior Publication Data

US 2018/0334066 A1  Nov. 22, 2018

Related U.S. Application Data

(63) Continuation-in-part of application No. 15/599,008, filed on May 18, 2017.

(51) Int. Cl.
| | |
|---|---|
| *B60N 2/70* | (2006.01) |
| *B68G 7/052* | (2006.01) |
| *B68G 7/02* | (2006.01) |
| *B60N 2/64* | (2006.01) |
| *B60N 2/58* | (2006.01) |

(52) U.S. Cl.
CPC ......... *B60N 2/7017* (2013.01); *B60N 2/5891* (2013.01); *B60N 2/64* (2013.01); *B68G 7/02* (2013.01); *B68G 7/052* (2013.01)

(58) Field of Classification Search
CPC ...... B60N 2/5891; B60N 2/64; B60N 2/7017; B60N 7/02; B60N 7/052
See application file for complete search history.

(56) References Cited

U.S. PATENT DOCUMENTS

| | | | |
|---|---|---|---|
| 3,222,697 A | | 12/1965 | Scheermesser |
| 4,673,542 A | * | 6/1987 | Wigner .............. A44B 18/0076 264/275 |
| 4,726,975 A | * | 2/1988 | Hatch ................ A44B 18/0076 24/444 |
| 4,754,720 A | | 7/1988 | Dietrich et al. |
| 4,792,111 A | * | 12/1988 | Taguchi ............. A44B 18/0076 249/83 |
| 4,814,036 A | * | 3/1989 | Hatch ................ A44B 18/0076 156/245 |

(Continued)

FOREIGN PATENT DOCUMENTS

| | | |
|---|---|---|
| DE | 102010035845 | 3/2012 |
| EP | 2611653 | 7/2013 |

(Continued)

*Primary Examiner* — James M Ference
(74) *Attorney, Agent, or Firm* — Brooks Kushman P.C.

(57) ABSTRACT

A method for manufacturing a vehicle seat cushion assembly includes providing a perforated outer material to define an outer seating surface. A backing material is sewn to the outer material using a first sewing line against which a wadding material is placed in a central region of the cushion. The wadding material is further secured by a hook and loop fastening product to the backing material. To secure the wadding material, a second sewing line is run. Left and right wadding materials are placed between the sewing lines and the edges of the cushion. Additional sewing lines laterally cross the longitudinal sewing lines to imbue the cushion with a wrist watch-like appearance.

15 Claims, 4 Drawing Sheets

(56) References Cited

U.S. PATENT DOCUMENTS

| | | | | |
|---|---|---|---|---|
| 4,881,997 A | * | 11/1989 | Hatch | A44B 18/0076 |
| | | | | 156/66 |
| 4,933,224 A | * | 6/1990 | Hatch | A44B 18/0076 |
| | | | | 24/306 |
| 5,089,191 A | * | 2/1992 | Hughes | B60N 2/5891 |
| | | | | 264/46.5 |
| 5,096,639 A | * | 3/1992 | Hughes | B60N 2/5875 |
| | | | | 264/46.5 |
| 5,110,649 A | * | 5/1992 | Morse | A44B 18/0076 |
| | | | | 24/444 |
| 7,823,980 B2 | | 11/2010 | Niwa et al. | |
| 8,584,333 B2 | | 11/2013 | Marques et al. | |
| 8,967,712 B2 | | 3/2015 | Yasuda et al. | |
| 2003/0098113 A1 | * | 5/2003 | Takei | B29C 44/143 |
| | | | | 156/79 |
| 2013/0140867 A1 | | 6/2013 | Posnien | |
| 2015/0072107 A1 | * | 3/2015 | Fujita | B32B 27/40 |
| | | | | 428/136 |
| 2016/0031350 A1 | * | 2/2016 | Smith | B60N 2/5825 |
| | | | | 297/452.48 |
| 2016/0167260 A1 | * | 6/2016 | Thomas | B32B 5/18 |
| | | | | 428/304.4 |
| 2017/0088028 A1 | * | 3/2017 | Nishikido | B60N 2/90 |
| 2017/0151897 A1 | * | 6/2017 | Nishikido | B60N 2/58 |
| 2017/0327021 A1 | * | 11/2017 | Okui | A47C 31/02 |
| 2018/0043805 A1 | * | 2/2018 | Baek | B29D 99/0092 |

FOREIGN PATENT DOCUMENTS

| | | |
|---|---|---|
| FR | 1456564 | 7/1966 |
| GB | 2439922 | 1/2008 |
| WO | 2012028218 | 3/2012 |

* cited by examiner

METHOD OF MANUFACTURING A SEAT BACK AND CUSHION ASSEMBLY

REFERENCE TO RELATED APPLICATIONS

This application is a continuation-in-part of U.S. application Ser. No. 15/599,008 filed May 18, 2017, the disclosure of which is hereby incorporated in its entirety by reference herein.

TECHNICAL FIELD

This disclosure relates to a method of manufacturing a seat back and cushion assembly and the assembly made thereby.

BACKGROUND

Vehicle seat backs and related cushions are made from numerous materials. They are configured in various shapes and sizes to accommodate the specific requirements of a customer or vehicle in which they are deployed. One material installed in passenger and commercial vehicles is real or synthetic leather. Seat cushions may include a top surface of leather and an underlayment of a stiff backing material attached to the backside of the leather, with foam padding inserted between the top surface and the underlayment.

Although the stiff backing material may facilitate manufacturing and assembly processes, using such a material on a vehicle seat back has certain drawbacks. For example, the stiff backing material has different stretch characteristics from the leather upper material. This can lead to crease lines in the resulting seat back cushion surface.

One concern is that many seat backs use a thick seat trim cover panel made of multiple layers—e.g., an upper material, a foam wadding material, and a backing material. Such a seat back may not lie flat when attached to a seat frame. The process of attaching the backing material to the leather material with a foam padding interposed may result in a seat back cushion having a rear surface that undulates, especially if the leather is perforated.

Another reason that a seat back cushion may be difficult to attach to a seat structure is that many cushions for example are manufactured with a generally rectangular perimeter. This facilitates the manufacturing processes by presenting material pieces that can readily be cut and assembled. For instance, if the entire seat cushion has a generally rectangular perimeter, the piece or pieces of foam padding can also have a generally rectangular shape. This makes it easier to insert the foam padding into pre-sewn pockets formed by the leather and the stiff backing material. Despite the ease of manufacturing, a rectangular shape may be suboptimal from a fit and finish perspective.

It would therefore be desirable to provide a method of manufacturing a seat back cushion and assembly that overcome some or all of these problems.

Among the art considered in preparing this patent application are U.S. Pat. Nos. 3,222,697; 4,754,720; 7,823,980; 8,584,333; 8,967,712; 2013/0140867; WO 2012/028218; DE 10 2010 035 845; EP 2 611 653; FR 1 456 564; and GB 2439922.

SUMMARY

Disclosed is a method for manufacturing a seat back cushion or seat cushion (collectively "seat cushion") and an assembly thus manufactured. As a frame of reference, the seat back cushion can be considered to have longitudinally running side edges and laterally oriented top and bottom edges. The method includes these steps, not necessarily in the order presented:

1. providing a preferably perforated outer material such as leather to define a surface that faces a seat occupant;
2. adhering a backing material to the outer material (or vice-versa) using a first longitudinally oriented sewing line;
3. securing one or more fastening products (e.g. hook and loop Velcro®) to the backing material;
4. placing a wadding or padding foam or hacoflex material adjacent to the first longitudinally oriented sewing line and a fastening product so that the wadding or padding foam or hacoflex is secured to the backing material;
5. sewing the backing material to the outer material (or vice-versa) using a second longitudinally oriented sewing line so that the wadding material is secured between the first and second sewing lines by the fastening product;
6. making a longitudinally running tiered or zig-zag sewing line between the first and second sewing lines from the top to the bottom edges (or vice-versa) of the seat cushion;
7. placing a wadding material between the outer and backing materials and between the first sewing line and an edge of the seat cushion and securing the wadding material by sewing a seam along a side edge, which may be straight or curved;
8. placing a wadding material between the outer and backing materials and between the second sewing line and an opposite edge of the seat cushion and sewing a seam along the other side edge, which may be straight or curved; and
9. making a plurality of laterally oriented sewing lines between the side edges of the seat back cushion.

By practicing these steps and their variants, a wrist watch-like pattern may be formed on the seat back.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
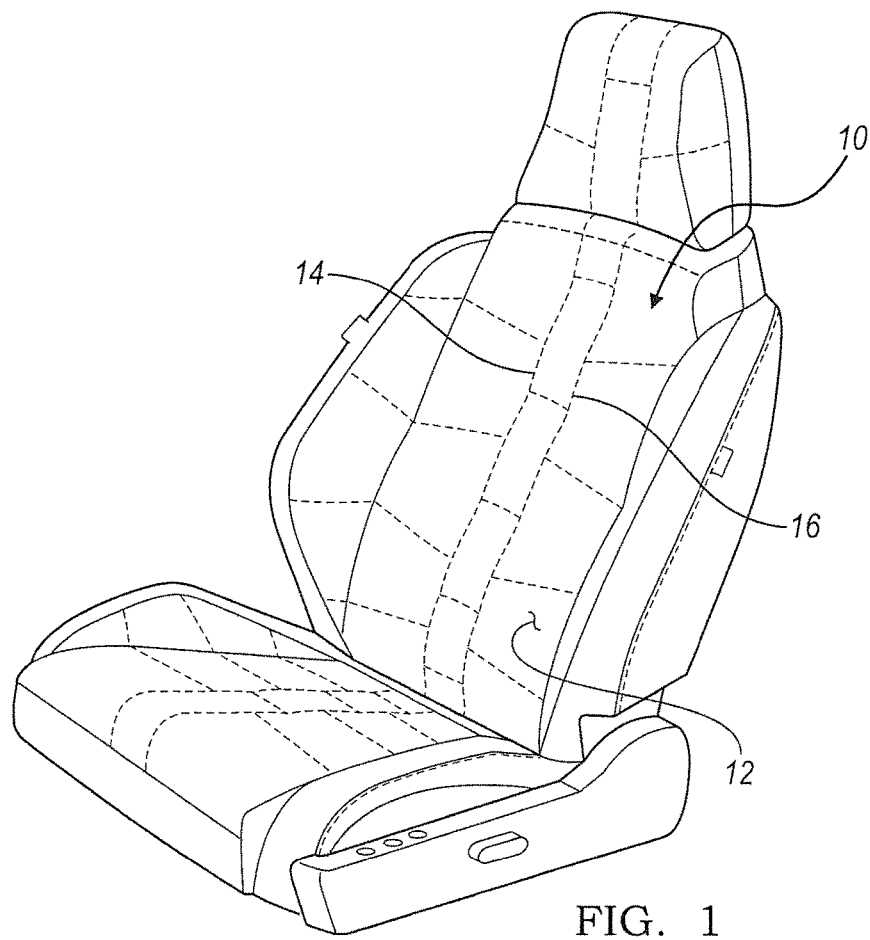
FIG. 1 shows a vehicle seat cushion assembly including a seat back cushion and a seat cushion in accordance with an embodiment of the present invention.

FIG. 1 shows a vehicle seat assembly 10 including a seat back cushion and a seat cushion in accordance with an embodiment of the invention. The disclosed method can be deployed in the making of a seat back cushion or a seat cushion or both. For simplicity, this disclosure focuses on a method of making a cushion that is associated with a seat back. Thus, it is to be understood that as used herein the term "seat back cushion" includes a front or rear seat back or a seat base or both a seat back and seat base by which a seat occupant may supported.

The vehicle seat assembly includes a seat back cushion 10 with an outer material 12, which may for example be leather, which may or may not be perforated. The outer material 12 may have one or more layers, only some of which may be leather. Such material 12 defines an outer seat cushion surface (FIG. 3), which is a surface contacting an occupant of the seat.

Figure 2:
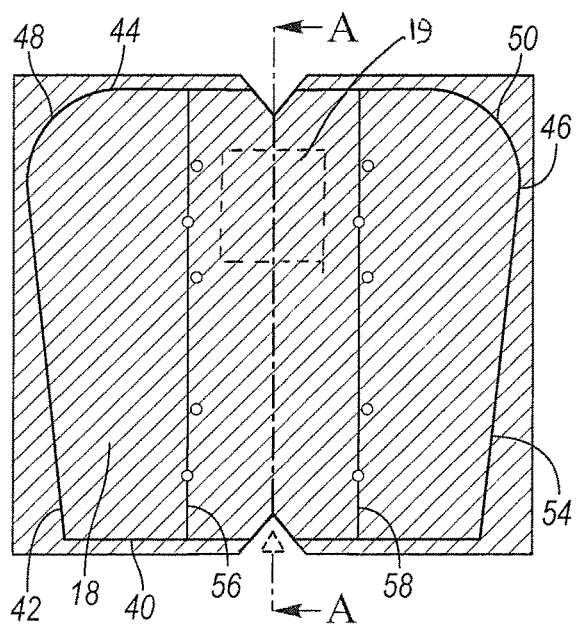
FIG. 2 shows a backing material used with the seat back cushion shown in FIG. 1.
Figure 3:
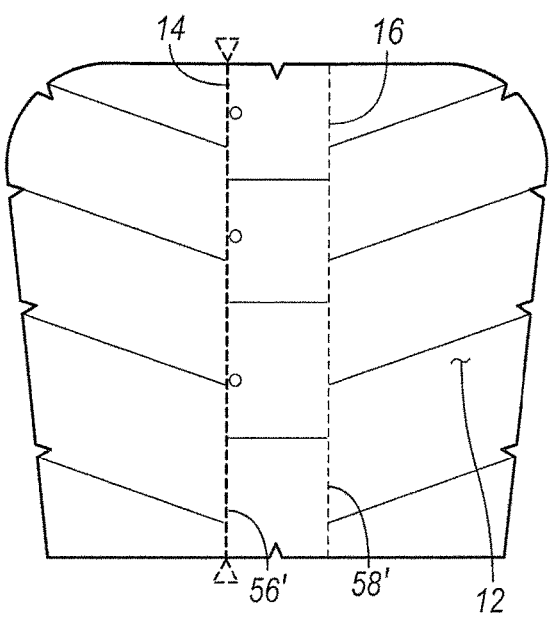
FIGS. 3-14 depict various steps in a representative manufacturing process.
Figure 4:
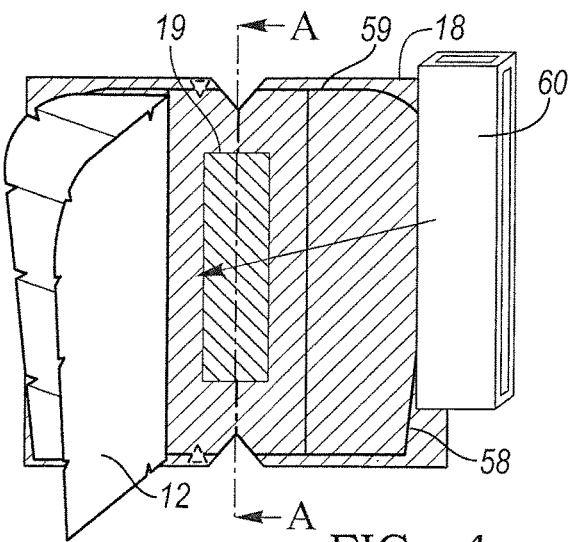
Figure 5:
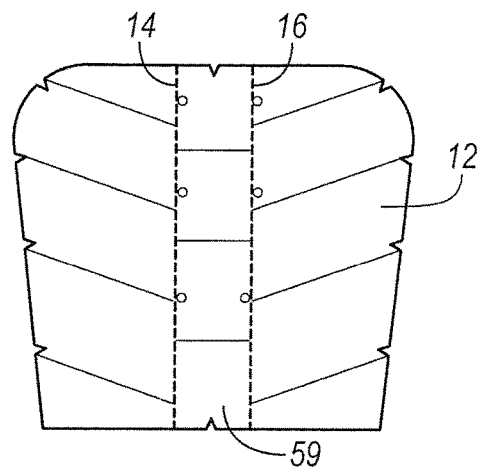
Figure 7:
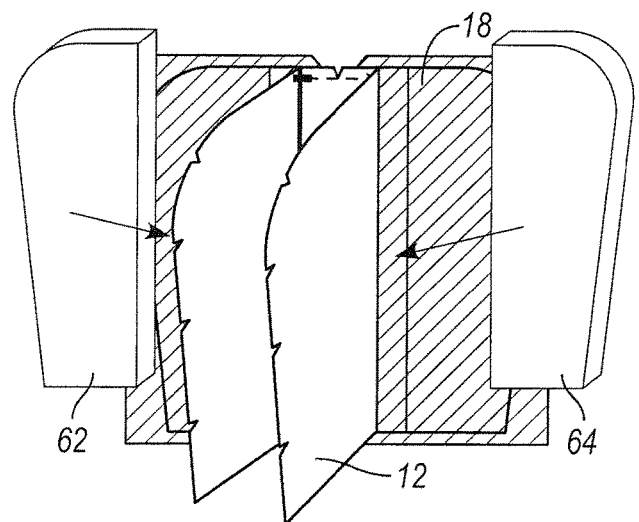

The outer material 12 has an underside 15 (FIG. 4). Disposed on the outer surface 13 of the cushion assembly 10 are first and second sewing lines 14, 16 (FIG. 5), which are preferably disposed generally longitudinally and in some embodiments approximately parallel to each other. The sewing lines 14, 16 secure the outer material 12 to a backing material 18 (FIGS. 2-5). Optionally, one or more fastening products such as Velcro® (hooks and loops) 19 can be adhered or added to the backing material or tulle. Each fastening product helps maintain and provide adhesion to a foam pad 60, 62, 64 (FIGS. 4, 7, 8) so that the foam pad is securely positioned in relation to the backing material 18.

As used herein the term "backing material" includes for example a woven or non-woven or knitted or elastic tulle that may be light in weight and possess a stiffness characteristic for support. An elastic tulle is preferable, which has more memory, is able to absorb reasonable forces of deformation and revert to its undeflected state without deformation.

For ease of reference, the seat back cushion can be considered as having two linear or curved longitudinal edges, a top straight or curved edge and a substantially straight bottom edge. A "longitudinal" axis (A-A, FIG. 4) can be imagined as an axis of symmetry to run (in some embodiments) generally between the side edges. A lateral axis (not expressly depicted) can be imagined to extend in parallel with the bottom edges orthogonally to the longitudinal axis (A-A).

Figure 6:
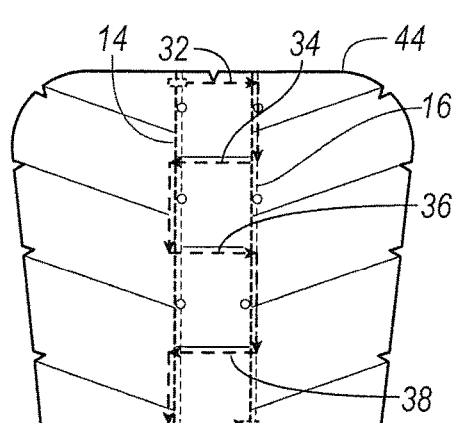

After being sewn in a manner to be described, sewing lines or seams 32-38 (FIG. 6) attach the outer material 12 to the backing material 18 while securing a pad or wadding material 60 (FIGS. 4, 7 & 8) therebetween. An outer perimeter of the outer material 12 is generally defined by side edges and a top and bottom edge segments 40, 42, 44, 46 (FIG. 2). In addition, an outer perimeter of a seat back 10 in accordance with embodiments of the present disclosure may have one or more curved segments, such as the segments 48-50 (FIG. 2). Other edge embodiments may have a curved perimeter with few or no linear segments.

FIG. 2 shows a typical way to prepare the elastic tulle or support material 18 in more detail. A loop of Velcro® is sewn on the B face of the tulle 18. After the tulle 18 is turned, a leather pattern 12 is superimposed on to the tulle 18. The sewing process then begins. The backing material 18 has a perimeter that is generally defined by corresponding linear or curved edge segments. In at least some embodiments, the backing material 18 has a stretchability that is greater than the stretchability of the outer material 12. This helps to overcome problems associated with seat cushion assemblies having a stiff backing material, which tends to pull on the side or bolster cushions of the seat assembly when an occupant is seated. Thus, in embodiments having a backing material of lower stiffness, such as the material 18, the backing material deforms at least as much or more than the outer material 12. This tends to produce a better fit and provide greater comfort for the vehicle occupant. The material 18 may be, for example, a woven tulle or knit tulle or other similarly elastic material.

Also shown in FIG. 2 are optional markings 56, 58 to guide the first and second sewing lines 14, 16 (see also FIGS. 2 and 3). The line 56 corresponds to the location of the first sewing line 14, while the second line 58 corresponds to the location of the second sewing line 16.

FIGS. 3-14 typify representative steps in the assembly process that are practiced in making the seat back or cushion 10. It is to be appreciated that the steps need not be practiced in the order depicted or described.

One way to practice the disclosed method steps is as follows. As shown in FIG. 3, the outer material 12 is placed over the backing material 18 such that location lines 56' 58' on the material 12 are aligned with the location lines 56, 58 (not visible in FIG. 3) on the backing material 18. If desired, (see FIG. 4) one or more fastening products such as strips of Velcro® or a Velcro-like material 19 (e.g. about 40 mm in width) are adhered to the reverse face of the material or tulle 18. These strips serve to secure a foam pad 60 to the tulle 18. Conventionally, a Velcro® strip has a male side ("hook") and a female ("loop") side. Preferably the hook side is affixed to or integrated with the foam pad cushion 60. It secures the foam pad 60 and the loop side is affixed (e.g. sewn) to the B face of the cover (or tulle 18). This permits the pad 60 and thus the outer material 12 to be shaped with more precision. For example, curved edges or seams can readily be created and the cover may readily conform to the shape of the seat. "Bagginess" or unwanted "wave" effects are therefore avoided. If desired, perforated leather 12 can be used as the outer material with good effect. This is helpful if the leather is perforated and environmental or climate controls are included in the seat back or cushion or both to produce a breathable arrangement of the perforated leather, the foam pad and the tulle.

Then, as shown in FIG. 3, the first sewing line 14 is laid, thereby securing the outer and backing materials 12, 18 to each other along the longitudinally oriented seam 14, which may be substantially straight or curved. Next, a wadding material 60 (e.g. foam, FIG. 4) is juxtaposed with the first sewing line 14. Then a second sewing line 16 (FIG. 5) is laid. Sewing the two pieces of material 12, 18 to each other using the first and second sewing lines 14, 16 creates a longitudinally oriented central interior space 59 between the outer and backing materials 12, 18 and between the first and second sewing lines 14, 16. The interior space 59 encapsulates the wadding material 60 in a longitudinally extending central portion of the seat back cushion 10.

In one variant, the assembly method continues (FIG. 6) with a step of making zig-zag, tiered sewing lines 32-38 between the first 14 and second 16 sewing lines. The tiered sewing lines 32-38 commence at one edge, such as a top edge 44 and run centrally as shown in a zig-zag fashion to the opposite edge, such as the bottom edge 40, or vice-versa. In this way, a central portion of the wadding material 60 is further secured in a decorative and functional manner. In more illustrative detail, the zig-zag or tiered longitudinal sewing lines 32-38 include lateral segments and longitudinal segments. A lateral segment has a left end and a right end, and a longitudinal segment has a top end and a bottom end. The right end is serially connected to the top end and the bottom end is connected to the right end of a next segment and so on. It will be appreciated that the longitudinal or the lateral segments of the tiered sewing lines 32-38 may be invisible to the ordinary observer of a finished seat.

Figure 8:
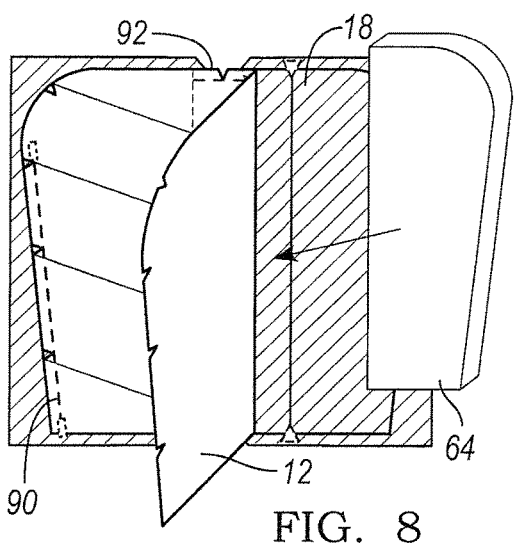

Assembly of the vehicle seat back cushion 10 continues (FIGS. 7-14) when another piece of wadding material 62 is placed on the left-hand side of the sewing line 14. If desired, this too may be further secured by a fastening product. More wadding material 64 is placed on the right-hand side of sewing line 16 (FIG. 8). If desired, this too may be further secured by a fastening product. As with the other wadding material described herein, this wadding material may include at least one of a reticulated (suitable for climate control applications) or urethane foam or a bio-based foam, such as foam created from a soy polyol, although other types of wadding material may be used as desired. Material choice and thickness are influenced by desired volume, and comfort. In one application, a reticulated foam (45+/−3 Kg per $m^3$) e.g. polyurethane foam-polyether based is suitable for a climate control application. One or more peripheral seams 90 secure the pad 64 at a side edge of the backing material 18 (FIG. 9).

Figure 9:
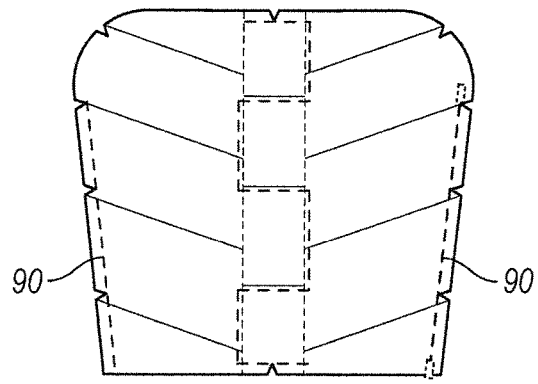
Figure 10:
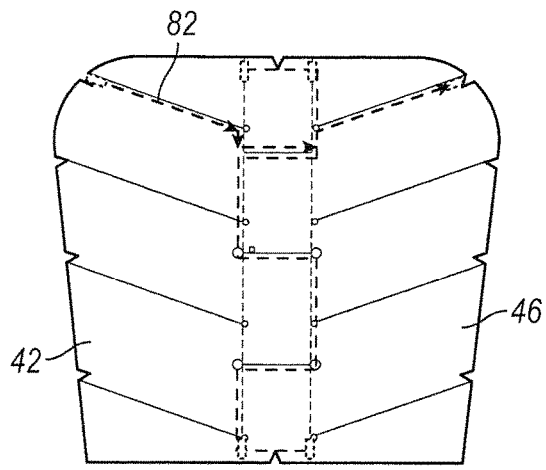
Figure 11:
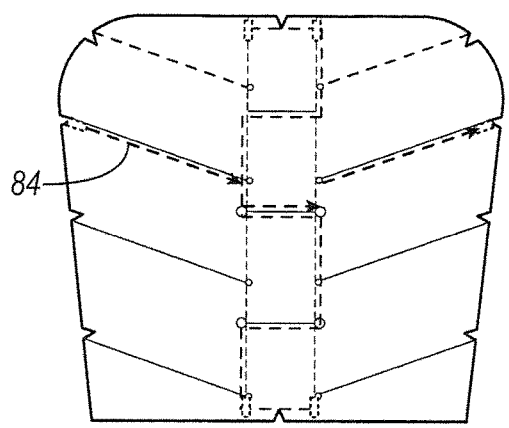
Figure 12:
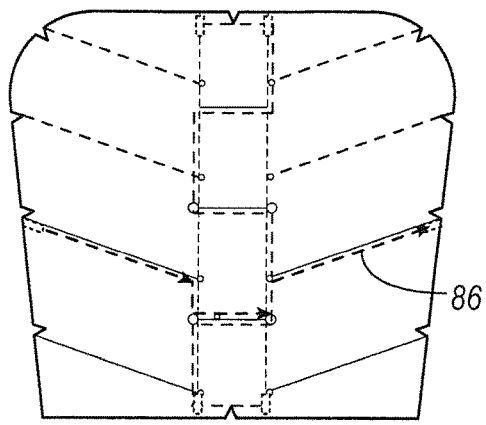
Figure 13:
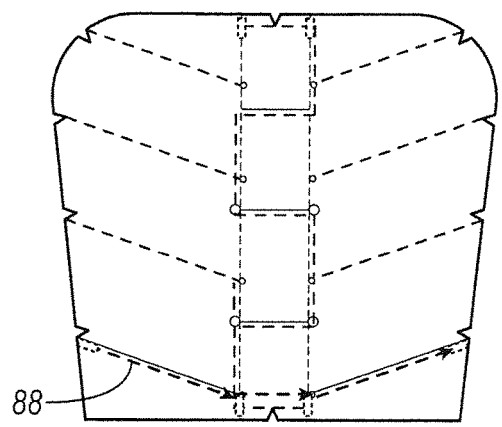
Figure 14:
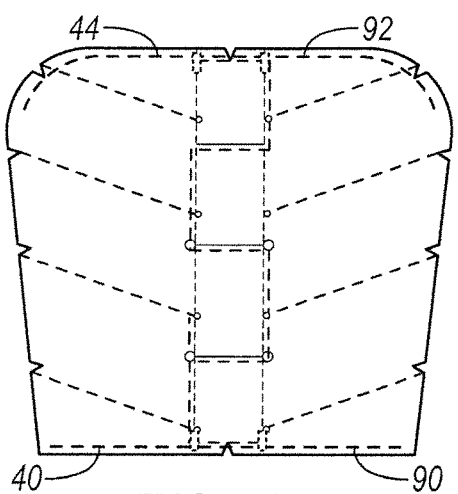

If desired, a glazing can be applied to an underside of the outer material (FIG. 9).

As shown in FIGS. 10-13, a plurality of laterally oriented seams 82-88 may be sewn from the side edges 42, 46 of the seat back cushion 10. Although depicted as running in an inclined manner in the off-center regions, the sewing lines 82-88 may optionally be oriented so that they run generally horizontally. In one embodiment, the laterally oriented sewing lines 82-88 are generally perpendicular to the first and second sewing lines 14, 16. The sewing lines 82-88 include a left stitch segment that runs across a left portion of the outer material 12, a middle segment that runs across a center portion of the outer material 12 and a right segment that runs across a right portion of the outer material 12. In this context "generally" means within about 30 degrees of a horizontal axis.

Final steps (FIG. 14) optionally involve sewing the outer 12 and backing materials 18 together using one or more additional sewing lines 90-92 respectively disposed adjacent edges 40, 44 of the wadding material 60 proximate peripheral edges of the seat back cushion 10.

Figure 15:
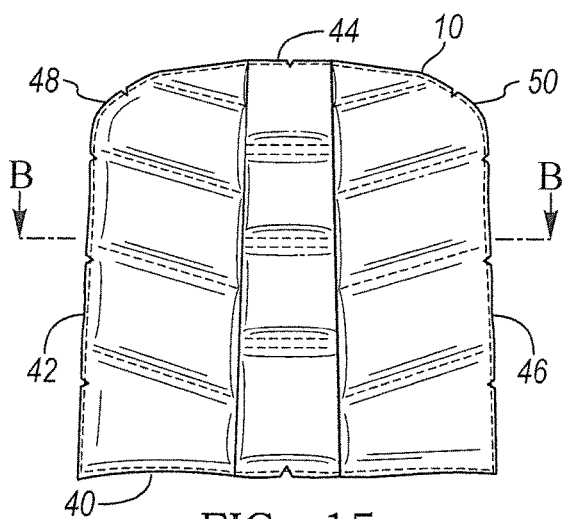
FIG. 15 is a frontal view of an illustrative seat back cushion thus manufactured with an appearance that resembles a wrist watch strap.

In some applications, the outer 12 and backing materials 18 have curved longitudinal perimeters 42, 46 joined by a curved top and generally straight bottom edges 40, 44 that may be joined by rounded corners 48, 50 (FIG. 15).

Optionally, the wadding material 60 such as a foam pad, polyurethane (PU), polyester (PES), and/or polyether includes foam having a thickness in an un-deflected state of about 15 mm and a density of about 33 Kg/cubic meter. In one embodiment, an assembly yarn (80 Tex) is used with a stitch yarn (107 Tex).

Together the outer material 12 with the laterally oriented 82-88 and longitudinally oriented 32-38 sewing lines may present an appearance that is akin to a wrist watch strap.

Figure 16:
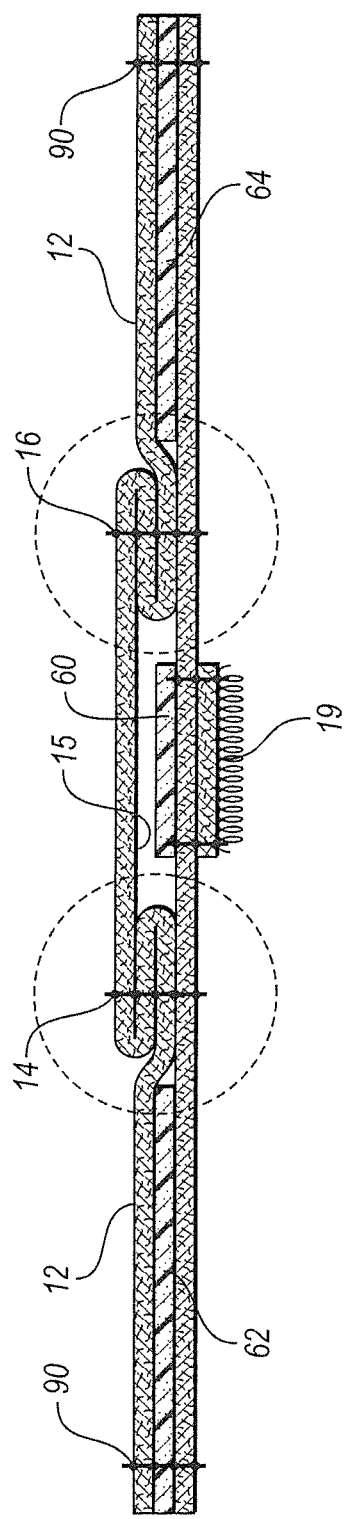
FIG. 16 is a representative cross-section taken along the line B-B of FIG. 15.

FIG. 16 is a representative cross-sectional view taken along the line B-B (FIG. 15) of one embodiment of a seat cushion assembly made by following the steps described earlier. Of note is the folded configuration of, for example, a leather seating surface that adds volume and cushioning to the seat.

It will be appreciated that the sewing process disclosed herein is offered as being illustrative. Differently sized steps or sewing orientation are also contemplated.

| Reference Number | Feature Name |
|---|---|
| 10 | vehicle seat assembly |
| 12 | outer material (e.g., perforated leather) |
| 14 | first sewing line |
| 15 | underside of 12 |
| 16 | second sewing line |
| 18 | backing material (e.g., woven tulle or knit tulle or other elastic material) |
| 32-38 | longitudinally oriented sewing lines to secure 12 to 18 |
| 40-46 | linear edge segments of 12 |
| 48-50 | curved segments |
| 56 | location line of 14 |
| 58 | location line of 16 |
| 59 | interior space between 12, 18, 14 & 16 |
| 60 | wadding material into 59 |
| 62-64 | wadding material between 12 & 18 on left and right sides |
| 82-88 | laterally oriented sewing lines affixing 12 & 18 |
| 90-92 | peripheral sewing lines affixing 12 & 18 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of manufacturing a seat cushion for a vehicle seat assembly, the seat cushion having side edges and top and bottom edges, the method comprising:
   providing an outer material to define a surface that faces a seat occupant;
   affixing a backing material to the outer material using a linear first longitudinally oriented sewing line;
   securing one or more fastening products to the backing material;
   placing a first wadding material adjacent to the linear first longitudinally oriented sewing line in a centrally located region of the backing material so that the first wadding material is secured to the backing material;
   affixing the backing material to the outer material using a linear second longitudinally oriented sewing line so that the first wadding material is secured by a fastening product of the one or more fastening products between the linear first and second longitudinally oriented sewing lines, the first and second linear longitudinally oriented sewing lines defining therebetween a central region;
   making a tiered sewing line confined to the central region between the linear first and second longitudinally oriented sewing lines, the tiered sewing line running at least partially between the top and bottom edges;
   disposing a second wadding material between the outer and backing materials and between the linear first longitudinally oriented sewing line and an edge of the seat cushion;
   disposing a third wadding material between the outer and backing materials and between the linear longitudinally oriented second sewing line and an opposite edge of the seat cushion;

sewing along the side, top and bottom edges of the seat cushion to further secure the first and second wadding materials;

making a plurality of laterally oriented sewing lines running at least partially from the side edges of the seat back cushion; and sewing the outer and backing materials together using additional sewing lines respectively disposed proximate the top and bottom edges of the seat cushion.

2. The method of claim 1, wherein the laterally oriented sewing lines in the central region are generally perpendicular to the first and second longitudinally oriented sewing lines.

3. The method of claim 1, wherein the one or more fastening products includes a hook and a loop layer, further including adhering a loop layer of the one or more fastening products to the backing material.

4. The method of claim 1, wherein the outer material includes a perforated leather and the backing material includes a woven tulle.

5. The method of claim 1, wherein the outer and backing materials have generally curved longitudinal perimeters with a curved top and generally straight bottom edge that are joined by rounded corners.

6. The method of claim 1, wherein the first, second and third wadding materials include a foam having constituents selected from the group consisting of a urethane material, a bio-based material, hacoflex and mixtures thereof.

7. The method of claim 1, wherein the first, second and third wadding materials include foam that is reticulated.

8. The method of claim 1, wherein the tiered sewing lines include a lateral segment and a longitudinal segment.

9. The method of claim 8, wherein the lateral segment has a left end and a right end, and the longitudinal segment has a top end and a bottom end.

10. The method of claim 9, wherein the right end of a lateral segment is connected to the top end of a longitudinal segment and the bottom end of a longitudinal segment is connected to a right end of a next segment.

11. The method of claim 1, wherein the plurality of laterally oriented sewing lines includes a left stitch segment that runs at least partially across a left portion of the outer material, a middle segment that runs at least partially across the central region of the outer material and a right stitch segment that runs at least partially across a right portion of the outer material.

12. The method of claim 11, wherein the left and right stitch segments are inclined in relation to the middle segment.

13. The method of claim 1, further including a step of applying a glazing on an underside of the outer material.

14. The method of claim 1, wherein the securing of the one or more fastening products to the backing material includes adding a strip or loop of Velcro® to a reverse side of the backing material to secure the first wadding material to the backing material.

15. The method of claim 14, wherein the Velcro® has a hook side that is affixed to the first wadding material and a loop side that is affixed to a B face of the outer material to permit the outer material to be shaped.

* * * * *